(12) United States Patent
Ignatian

(10) Patent No.: US 8,578,752 B2
(45) Date of Patent: Nov. 12, 2013

(54) FRAMEWORK WITH STANCHIONS FOR A PROVER

(75) Inventor: Alexander Ignatian, Phoenix, AZ (US)

(73) Assignee: Flow Management Devices, LLC, Phoenix, AZ (US)

( * ) Notice: Subject to any disclaimer, the term of this patent is extended or adjusted under 35 U.S.C. 154(b) by 0 days.

(21) Appl. No.: 13/468,499

(22) Filed: May 10, 2012

(65) Prior Publication Data

US 2012/0216594 A1    Aug. 30, 2012

Related U.S. Application Data

(62) Division of application No. 12/652,813, filed on Jan. 6, 2010, now Pat. No. 8,196,446, which is a division of application No. 11/972,530, filed on Jan. 10, 2008, now Pat. No. 7,650,775.

(51) Int. Cl.
   *G01F 25/00*    (2006.01)
(52) U.S. Cl.
   USPC .......................................................... 73/1.19
(58) Field of Classification Search
   None
   See application file for complete search history.

(56) References Cited

U.S. PATENT DOCUMENTS

| | | | |
|---|---|---|---|
| 2,631,451 A | | 3/1953 | Ford et al. |
| 2,931,216 A | * | 4/1960 | Rauth ............................. 73/1.27 |
| 2,948,143 A | | 8/1960 | Pruitt |
| 3,098,382 A | | 7/1963 | Hoffman et al. |
| 3,120,118 A | | 2/1964 | Boyle |
| 3,403,544 A | | 10/1968 | Francisco, Jr. |
| 3,492,856 A | | 2/1970 | Francisco, Jr. |
| 3,608,353 A | * | 9/1971 | Larson ........................... 73/1.12 |
| 3,768,510 A | | 10/1973 | Reves |
| 3,877,287 A | | 4/1975 | Duntz, Jr. |
| 3,997,420 A | | 12/1976 | Buzza |
| 4,152,922 A | | 5/1979 | Francisco, Jr. |
| 4,307,601 A | | 12/1981 | Jackson |
| 4,312,230 A | | 1/1982 | Bricker et al. |
| 4,365,503 A | | 12/1982 | Ho et al. |
| 4,372,147 A | | 2/1983 | Waugh et al. |
| 4,390,035 A | | 6/1983 | Hill |
| RE31,432 E | | 11/1983 | Francisco, Jr. |
| 4,481,805 A | | 11/1984 | Dobesh |
| 4,537,058 A | | 8/1985 | Luper |
| 4,549,426 A | | 10/1985 | Erickson |
| 4,627,267 A | | 12/1986 | Cohrs et al. |
| 4,628,724 A | | 12/1986 | Maurer |

(Continued)

OTHER PUBLICATIONS

Daniel; "Brooks Compact Prover by Daniel", Emerson Process Management, 2005 Daniel Measurement and Control Inc., p. 1-15.

*Primary Examiner* — Robert R Raevis
(74) *Attorney, Agent, or Firm* — The von Hellens Law Firm, Ltd.

(57) ABSTRACT

A prover mounted upon a supporting lower framework includes a piston supporting rod extending longitudinally through a cylinder, which cylinder receives and discharges a fluid to measure the flow rate of the fluid by translation of the piston from the fluid receiving end to the fluid discharging end. Motive means supported on a frame mounted on the prover draws the rod toward the fluid receiving end of the cylinder. An upper framework is attached to the lower framework through a plurality of stanchions. Various I-beams formed as part of the upper framework enhance rigidity to the combination of lower framework and upper framework. The combination of lower framework and upper framework provides support for the prover in a horizontal or a vertical orientation without affecting the operation, repair or maintenance of the prover.

14 Claims, 8 Drawing Sheets

(56) References Cited

U.S. PATENT DOCUMENTS

| | | |
|---|---|---|
| 4,637,244 A | 1/1987 | Maurer et al. |
| 4,674,316 A | 6/1987 | Albrecht et al. |
| 4,718,267 A | 1/1988 | Capper |
| 4,766,759 A | 8/1988 | Cohrs et al. |
| 4,829,808 A | 5/1989 | West |
| 5,052,211 A | 10/1991 | Cohrs et al. |
| 5,251,489 A | 10/1993 | Lalin |
| 5,408,886 A | 4/1995 | Lalin |
| 7,650,775 B2 | 1/2010 | Ignatian |
| 8,161,791 B2 | 4/2012 | Ignatian |
| 8,196,446 B2 | 6/2012 | Ignatian |
| 8,205,479 B2 | 6/2012 | Ignatian |
| 2002/0157448 A1 | 10/2002 | Hirai et al. |
| 2004/0040368 A1 | 3/2004 | Guckenberger et al. |
| 2005/0217346 A1 | 10/2005 | Nagarkatti et al. |

\* cited by examiner

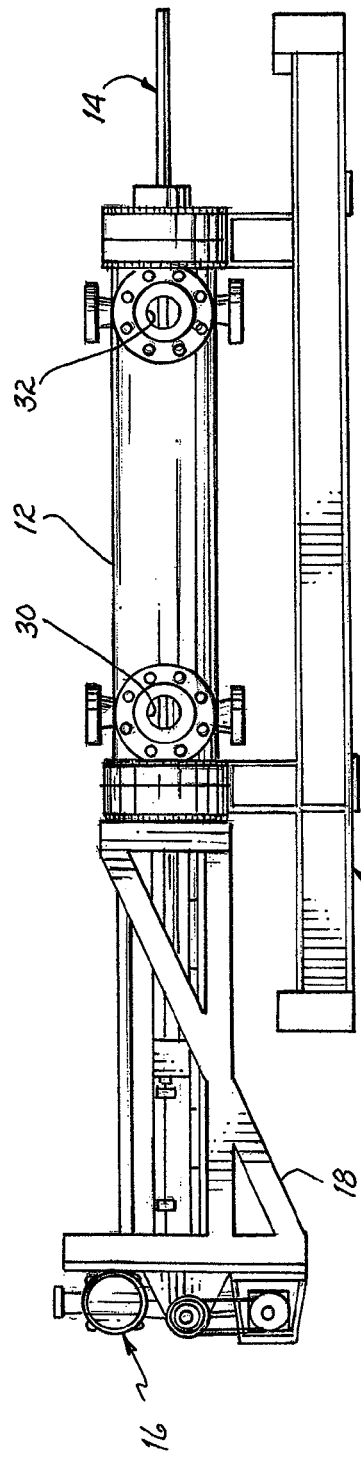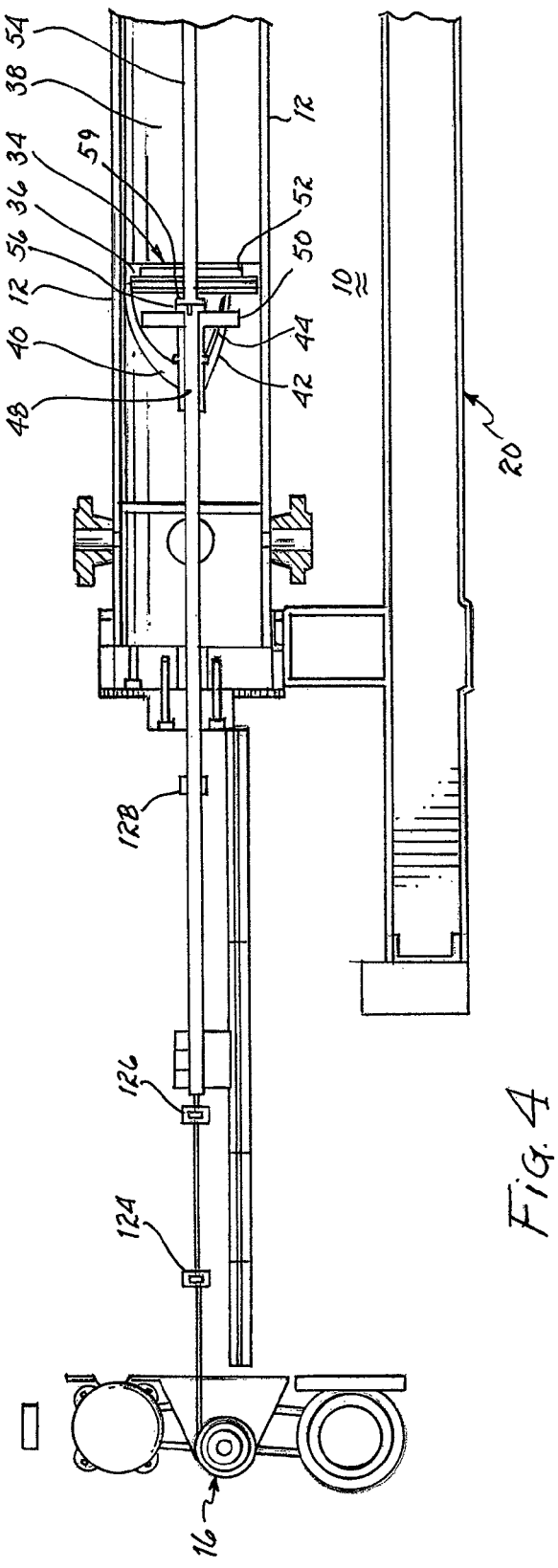
FIG. 3
FIG. 4

FRAMEWORK WITH STANCHIONS FOR A PROVER

CROSS REFERENCE TO RELATED APPLICATIONS

The present application is a divisional of an application entitled "FRAMEWORK FOR A PROVER", filed Jan. 6, 2010, and assigned Ser. No. 12/652,813, which is a divisional of an application entitled "UNIDIRECTIONAL CAPTIVE DISPLACEMENT PROVER", filed Jan. 10, 2008, and assigned Ser. No. 11/972,530, now U.S. Pat. No. 7,650,775.

FIELD OF THE INVENTION

The invention relates to the field of mountings for provers and, more particularly, to a framework for mounting a prover vertically or horizontally.

BACKGROUND OF THE INVENTION

In order to obtain accurate readings from a flow meter, it must be calibrated periodically by determining its characteristic or K-factor. The K-factor is a constant of proportionality between the flow rate of the fluid flowing through the flow meter and the response provided by the flow meter to the flow rate. A typical turbine type flow meter develops electrical oscillations proportional in number to the volume of flow through the flow meter. The characteristic is expressed in terms of the number of pulses generated by the flow meter per unit volume of fluid passing through the flow meter. Moreover, the characteristic is a function of the type of fluid as well as the fluid temperature, pressure, flow rate and varies as the flow meter parts wear in the course of use. An apparatus for determining the characteristic of a flow meter while in an operating fluid system is called a 'prover.' An apparatus for determining the characteristic of a flow meter on a test stand and not in a fluid system is called a 'calibrator.'

It is well known to determine the characteristic of a flow meter by comparing its response to a ballistic flow calibrator or prover connected in series with the flow meter. A prover uses a piston that travels in a cylindrical chamber in synchronism with a fluid traveling through the flow meter. By measuring the time interval required for the piston to travel through a known volume of the chamber, an average flow rate can be calculated. These calculations may be used to determine the characteristic (K-factor) of the flow meter.

In existing provers, the release and return of the piston involves many difficult mechanical problems which have not been regularly overcome. These mechanisms tend to be complex and the prover itself bulky and costly to construct. Some provers utilize complex reverser valves to reverse the direction of flow in a cylinder and thereby return the piston to its original position. Other embodiments utilize devices to retract a piston and restrain it in the upstream position or bypass the flow of the piston by means of a poppet or bypass valve when the prover is not being used in a proving test. Provers utilizing valves to reverse the direction of flow are known as 'bi-directional provers' because the proving test may be made with the piston traveling in either direction. Provers utilizing devices to retract and restrain the piston are known as 'unidirectional provers' because the fluid and piston always travel in the same direction in the cylinder during a test.

Numerous patents have issued disclosing various types of provers. U.S. Pat. No. 3,492,856 discloses a ballistic flow calibrator in which the piston has a passage through it. A valve seals the passage when it is closed and permits fluid flow through the piston when it is opened. U.S. Pat. No. 4,152,922 discloses a ballistic flow calibrator with an auxiliary piston and an auxiliary cylinder to control a fluid displacement measuring piston which moves through a fluid measuring cylinder as a fluid barrier the same distance as the auxiliary piston moves through the auxiliary cylinder. U.S. Pat. No. 3,492,856 describes a unidirectional flow meter calibrating apparatus employing a piston within a conduit where the piston is restrained in the upstream position by means of a complex motor, clutch and cable assembly located upstream of the conduit. A poppet valve, held open by the cable, provides a fluid passage through the piston when the apparatus in not being used for flow measurements. Releasing the cable permits fluid pressure to close the poppet valve setting the piston in motion. U.S. Pat. No. 4,152,922 discloses a prover in which a measuring piston is returned and restrained in its upstream position by means of a second control piston. The control piston travels through a separate control cylinder and is linked to the measuring piston by a rod. A source of pressurized air is used to move the control piston. U.S. Pat. No. 4,794,783 discloses a similar prover wherein the control cylinder is moved by pressurized hydraulic fluid.

SUMMARY OF THE INVENTION

The prover of the present invention includes a rod supporting a poppet valve formed as part of a piston within a cylinder having a fluid inlet and a fluid outlet. A pair of motor driven pulleys are used to wind thereupon a pair of belts having their ends secured to a shuttle fixedly attached to the rod. Upon actuation of the motor driving the pair of pulleys, the belts are wound thereupon to draw the rod and piston toward the inlet. The force exerted by the rod upon the poppet valve and the piston opens the poppet valve to permit fluid flow therethrough. To conduct a test, a clutch disengages the motor from the pulleys to accommodate rectilinear translation of the rod, closure of the poppet valve, and movement of the piston in response to the flow of fluid into the cylinder through the inlet. Various limit switches responsive to the position of the rod control the operation of the motor. For maintenance purposes, a disk of the poppet valve, generally in sealed engagement with a surrounding ring, is disengageable from the ring by a plurality of threaded bolts captured in a flange to draw the disk against the force of a spring, which spring biases the disk against the ring and thereby permit repair/replacement of sealing elements. A framework supporting the prover permits mounting the prover in a conventional horizontal position or in a vertical position to reduce the footprint of the prover.

BRIEF DESCRIPTION OF THE DRAWINGS

The present invention will be described with greater specificity and clarity with reference to the following drawings, in which:

FIG. 3 is a side elevational view of the prover showing the fluid inlet and outlet;

FIG. 4 is a partly cutaway view showing the poppet valve and piston disposed within the cylinder;

DESCRIPTION OF THE PREFERRED EMBODIMENT

Figures 1, 2:
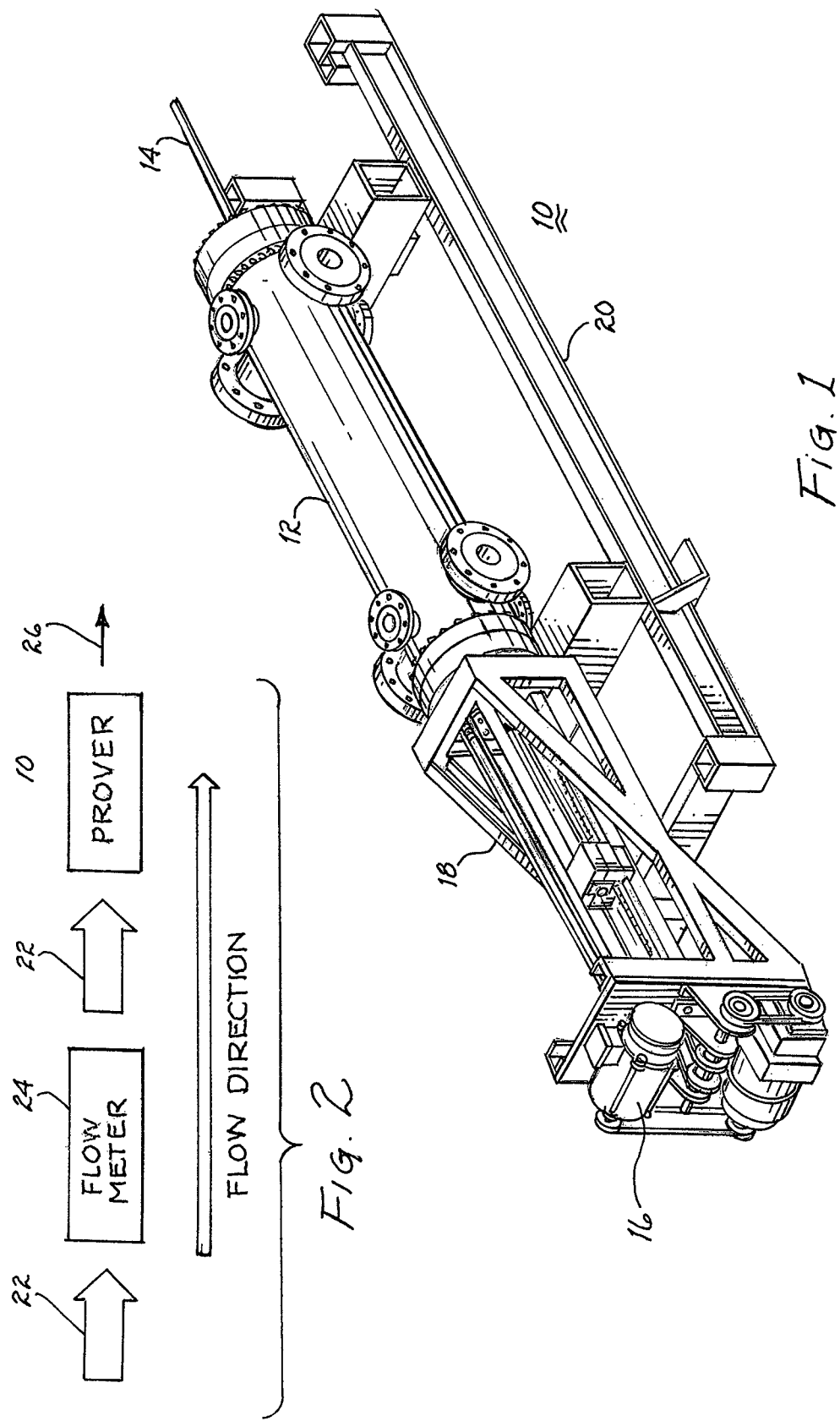
FIG. 1 is an isometric view of the prover horizontally mounted on a framework.
FIG. 2 is a graphic illustration of the fluid flow attendant the prover.

Referring to FIG. 1, there is illustrated a unidirectional captive displacement prover 10. The prover includes a cylinder 12 having a rectilinearly translatable piston with a poppet valve disposed therein and mounted on a rod 14. Motive means, generally identified by reference numeral 16, is supported upon a frame 18 attached to and extending from cylinder 12. The motive means imparts a force to rod 14 to cause translation in one direction of the piston within the cylinder. A clutch accommodates free translation of the rod and piston in the other direction.

Prover 10 is mounted upon a framework 20 that is attached at a location generally adjacent a flow meter 24 (see FIG. 2) to be periodically tested. As particularly shown in FIG. 2, a fluid 22 flows through a flow meter 24, which flow meter is to be tested, and into prover 10. Outflow from the prover is channeled into a conduit for the fluid, as represented by arrow 26. The prover includes various sensors and test equipment for determining the flow therethrough. This flow is compared to the indicated flow through the flow meter. Any difference reflects an adjustment to be made to the flow determined by the flow meter. This is generally referred to as a K-factor. Such testing of flow meters is required due to wear and other factors affecting the accuracy of the flow meter over time. Additionally, maintenance or replacement of parts may affect the accuracy of the flow meter and require testing in order to adjust and thereby correct the data provided by the flow meter.

Referring jointly to FIGS. 1, 3 and 4, further details of prover 10 will be described. Cylinder 12 includes an inlet 30 for receiving fluid from the flow meter (see FIG. 2). After fluid passes through the cylinder, it is exhausted through outlet 32 into a conduit for the fluid. A piston 34 is rectilinearly translatable within cylinder 12. The piston includes a ring 36 in sealed engagement with interior surface 38 of the cylinder, which sealing means accommodates translation of the piston relative to the cylinder without leakage. Ring 36 is supported by three arms 40, 42 and 44 extending from a sleeve 46 slidably encircling rod section 48 of rod 14. A poppet valve 35 includes a disk 50, configured to mate with opening 52 within ring 36. Seals are disposed between the disk and the ring to ensure that fluid does not leak therebetween. Rod 14 includes a further rod section 54. The abutting ends of the two rod sections include annular flanges 56, 58 mechanically attached to one another to thereby form rod 14. Disk 50 is mechanically attached to flange 56 of rod section 44 to ensure that translation of rod 14 causes a corresponding translation of the disk. A coil spring (not shown in FIG. 4) biases the disk against the ring to maintain a seal therebetween.

Figure 5:
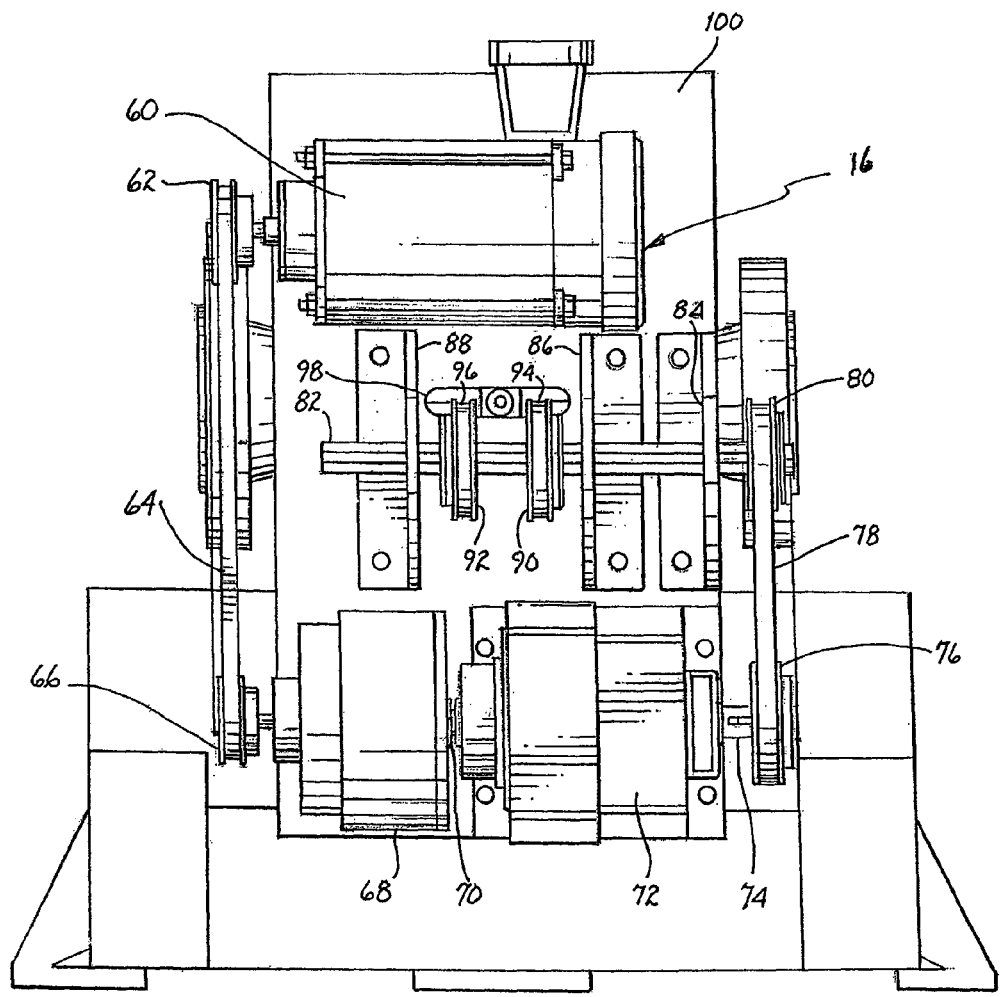
FIG. 5 is a rear view of the prover showing the motive apparatus for achieving rectilinear translation of the rod supporting the piston and the poppet valve.

Motive means 16, as shown in the end view depicted in FIG. 5, as well as in FIGS. 1, 3 and 4, includes an electric motor 60 for rotating a pulley 62 driving a belt 64. The belt engages a further pulley 66 driving a gear reduction unit 68. Shaft 70 of the gear reduction unit is connected to a clutch 72. Output shaft 74 of the clutch is or is not connected to shaft 70 as a function of operation of the clutch. The shaft 74 supports a pulley 76 driving a belt 78 in engagement with a further pulley 80. Pulley 80 is attached to shaft 82, which shaft is journaled within supports 84, 86 and 88 and supports reels 90, 92. To ensure commensurate rotation of the reels upon rotation of shaft 82, the interconnection may be splined or otherwise rigidly interconnected. Each of reels 90, 92 has attached thereto a belt 94, 96, respectively, which belts extend through opening 98 in plate 100, a part of frame 18.

It is to be understood that motive means 16 may be not only the electric motor described and illustrated, but could be a hydraulic motor, an internal combustion engine or other power source. Furthermore, the belts (64, 78) driving the associated pulleys (62, 66 and 76, 80) in the motive means could be replaced by conventional chains driving sprockets instead of pulleys. Belts 64, 78 and their respective pulleys 62, 66 may be collectively referred to as 'driving elements.' Similarly, belts 94, 96 extending from take up reels 90,92 could be replaced by conventional chains and take up sprockets, respectively. In a less preferred embodiment, belts 94, 96 could be replaced by cables and reels 90, 92 would be replaced by suitably configured reels to accommodate the cables. Belts 94, 96 and substitutable chains or cables may be collectively referred to as 'drawing elements.'

Figure 6:
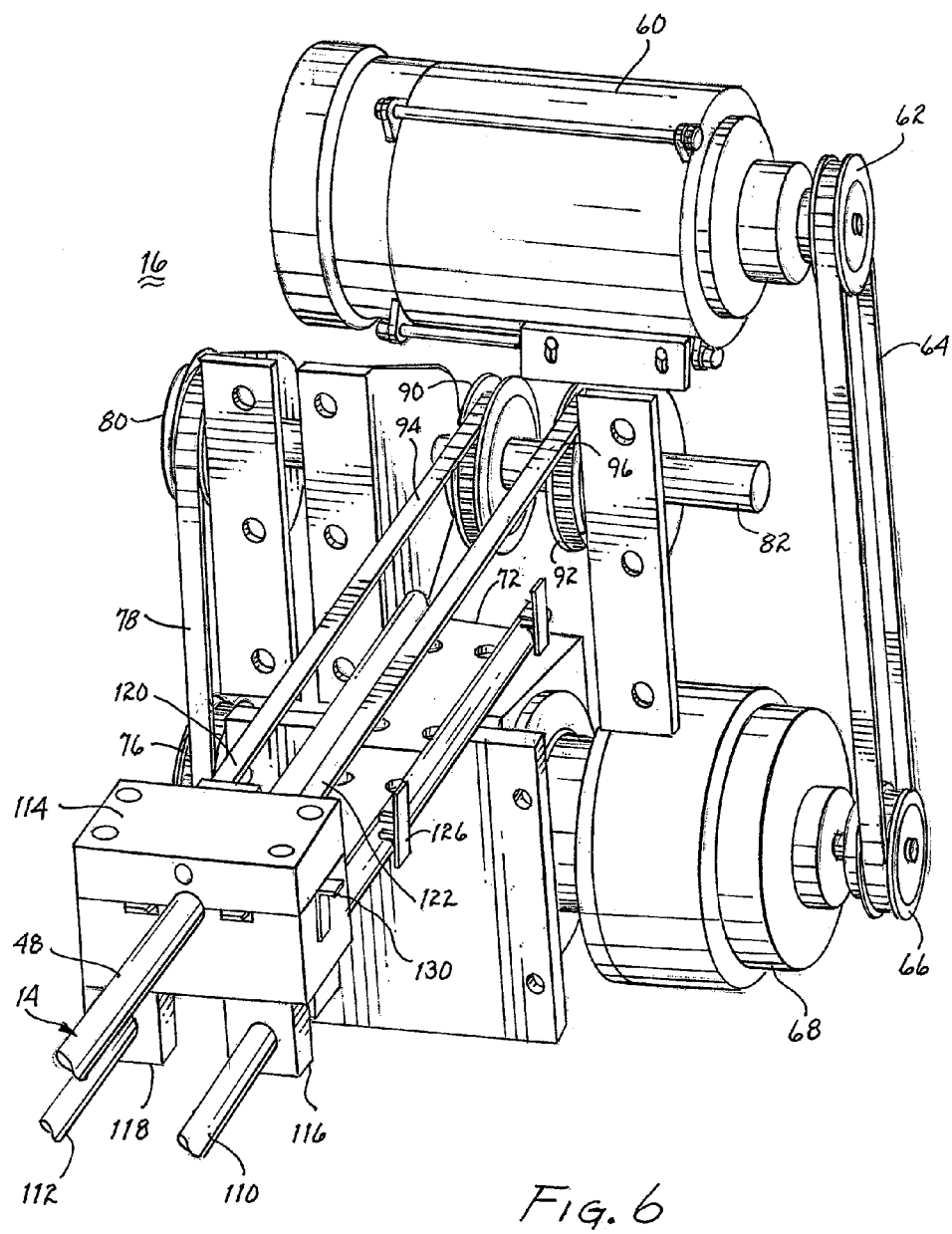
FIG. 6 is an isometric view of the motor driven apparatus for translating the rod.
Figure 7:
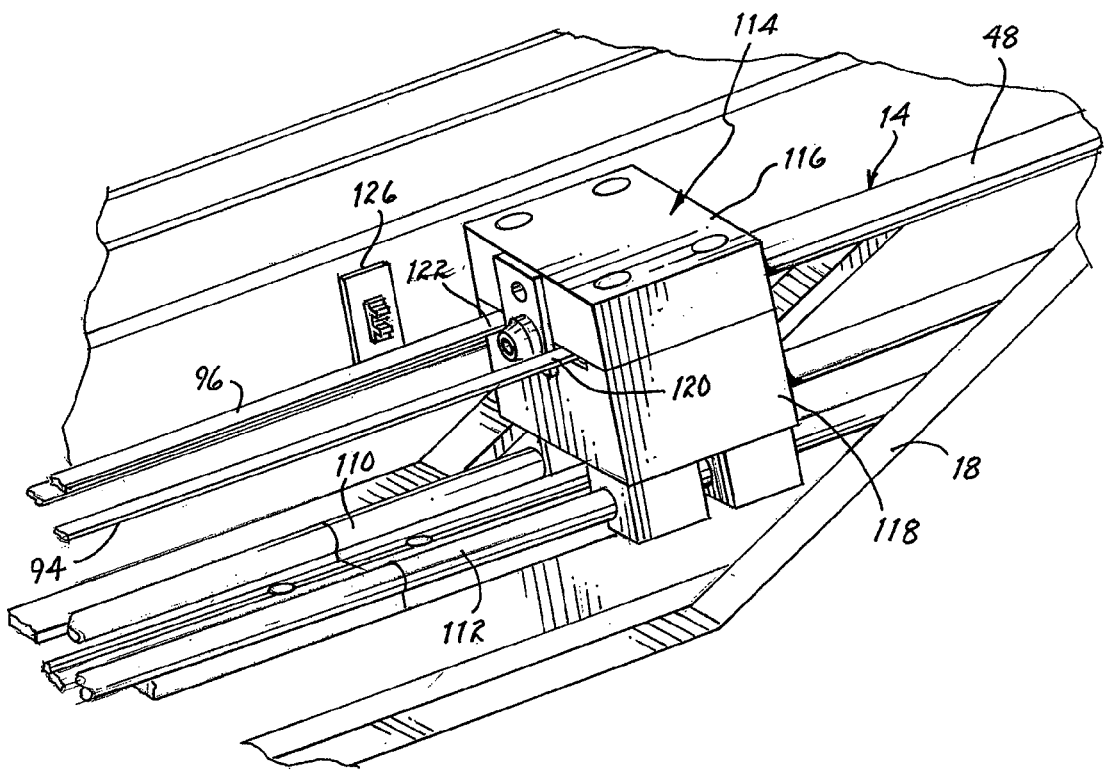
FIG. 7 is a detail view of the shuttle interconnecting the rod and a pair of belts.

Referring particularly to FIGS. 6 and 7, the interconnection between motive means 16 and rod 14 will be described. A pair of rods 110, 112 are attached to and extend intermediate cylinder 12 and frame 18. A shuttle 114 includes bearing blocks 116, 118 in slidable engagement with rods 110, 112. Thereby, the shuttle is slidable along these rods. Rod section 48 of rod 14 is rigidly clamped to shuttle 114 to ensure that any movement of the shuttle results in corresponding movement of the rod. Ends 120, 122 of belts 94, 96, respectively, are clamped or otherwise attached to shuttle 14. Thereby, any rectilinear motion of the belts will result in commensurate translation of the shuttle.

To control operation of rod 14 and poppet valve 35, a plurality of limit switches responsive, for example, to the position of shuttle 114 may be used. For example, as shown in FIG. 4, switch elements 124, 125, 128 may be mounted on frame 18 to cooperate with a further switch element 130 on shuttle 114. These switch elements may be mechanical, electrical or optical, as is well known in the art. Actuation of one or another of the switch elements will result in the generation of appropriate command signals relating to operation of motive means 16.

Figure 8:
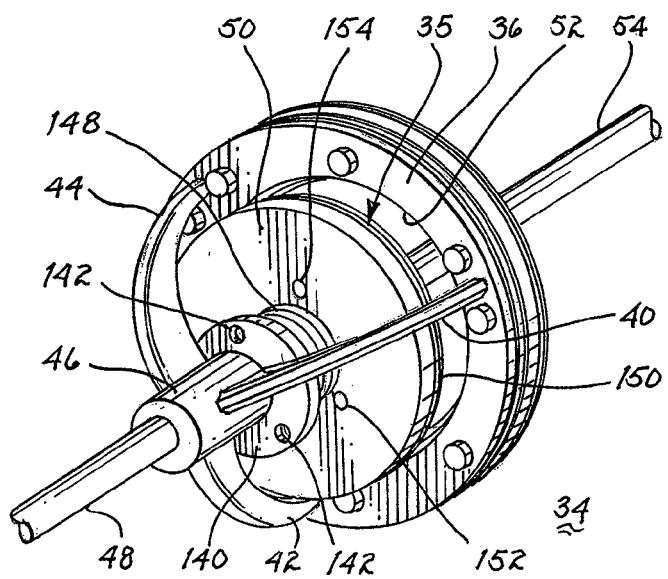
FIG. 8 illustrates the piston and associated poppet valve.

FIG. 8 is a detailed view of piston 34 and poppet valve 35 generally shown in FIG. 4. An annular flange 140 is secured to sleeve 46 and arms 40, 42 and 44. This flange includes three passageways 142, 144 and 146 (not shown) equiangularly disposed in flange 140. A coil spring 148, or the like, is disposed about rod section 48 to urge movement of disk 50 toward ring 36 and into sealing engagement therewith. A plurality of annular seals 150 are disposed about disk 50 for sealing engagement with opening 52 in the ring. Disk 50 includes a plurality of threaded apertures 152, 154 and 156 (not shown) equiangularly displaced in the disk radially external of spring 148 and in alignment with apertures 142, 144, and 146 (not shown), respectively.

Figure 9:
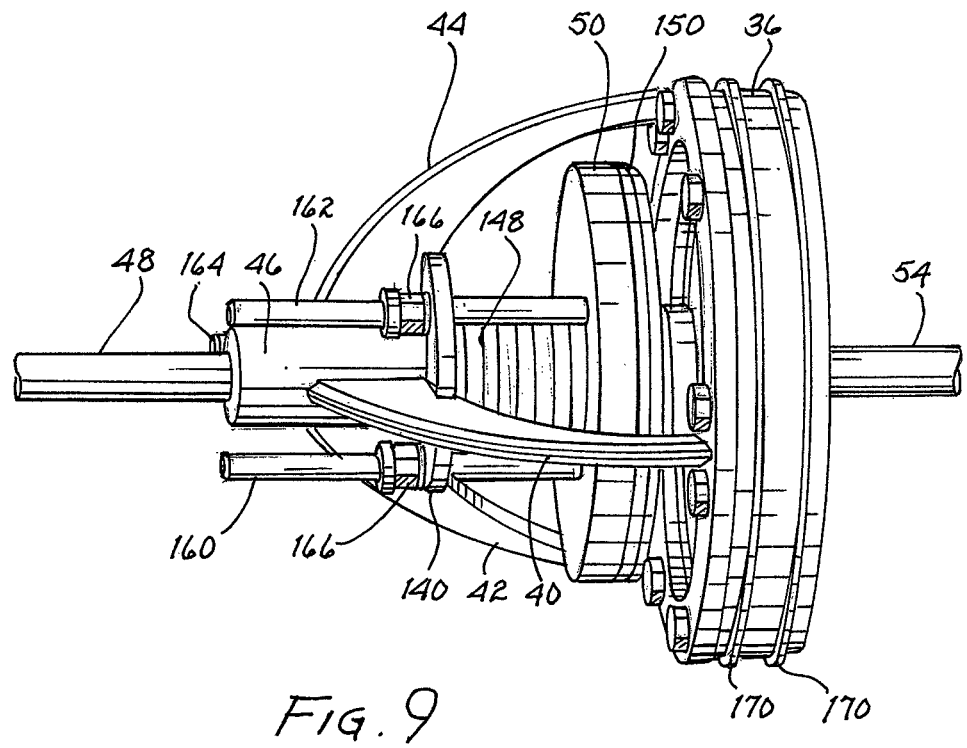
FIG. 9 illustrates the mechanism for manually opening the poppet valve to perform maintenance and/or repair on the poppet valve.
Figure 10:
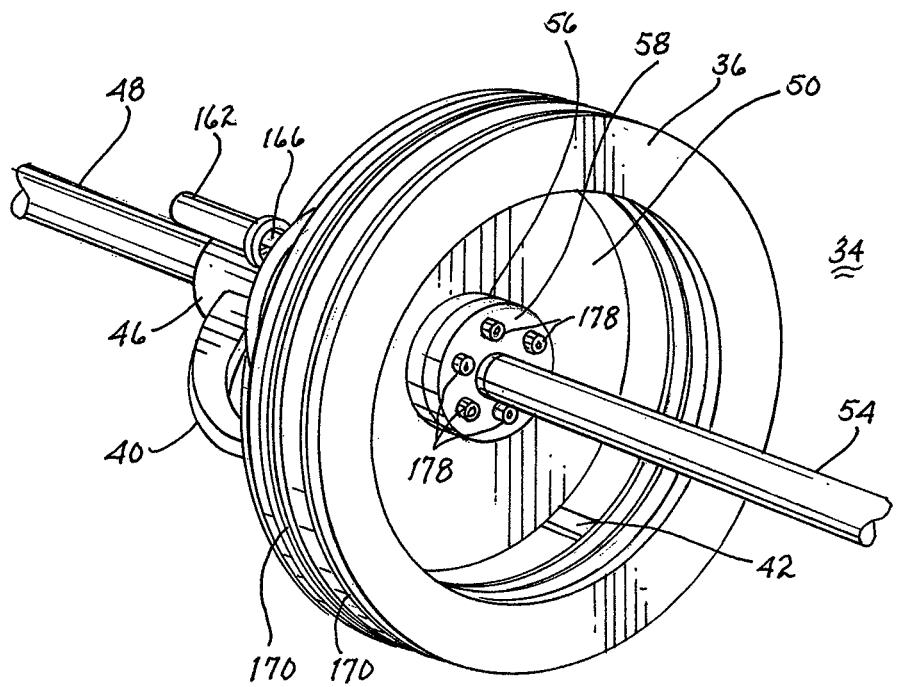
FIG. 10 illustrates the piston and the interconnection between the disk of the poppet valve and the rod sections.

Referring jointly to FIGS. 9 and 10, details attendant displacement of disk 50 from ring 36 to perform maintenance/repair on the disk or the ring will be described. Rods 160, 162 and 164 slidably engage apertures 142, 144, and 146, respectively, and into threaded engagement with threaded apertures 152, 154 and 156, respectively. The rods include nut-like elements 166 formed as part of or affixed to the rods to ensure that any rotation of these nut-like elements results in commensurate rotation of the respective rods. By rotating the nut-like elements clockwise (for instance), the threaded engagement with disk 50 will draw the disk toward annular flange 140 and compress coil spring 148 therebetween. Such movement will result in axial displacement of disk 50, as shown in FIG. 9. The resulting space between the disk and ring 36 may provide the necessary space to perform any maintenance or repair on the disk or the disk engaging parts of ring 36.

As particularly shown in FIG. 10, rod section 54 includes an annular flange 58 attached thereto. A similar annular flange 56 is attached to the end of rod section 48. A plurality of bolts 178 interconnect the annual flanges whereby rods sections 48, 54 form rod 14 discussed above. It may be noted that upon disengagement of annular flanges 56, 58, rod sections 48 and 54 become separable and, with appropriate disassembly of other components, permit replacement of piston 34 or its components, such as ring 36 and disk 50. To maintain a seal between piston 34 and interior surface 38 of cylinder 12 (see FIG. 4), annular seals 170 may be disposed about ring 36. During disassembly, these seals are also readily replaced.

Figure 11:
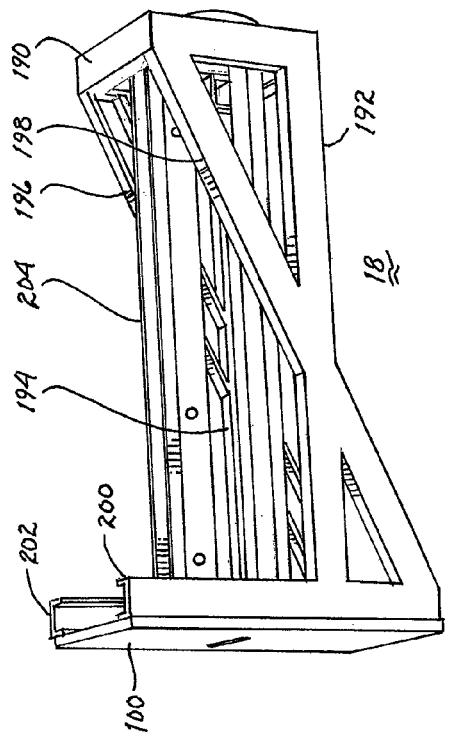
FIG. 11 illustrates the frame interconnecting the cylinder and the motive means for translating the piston.

FIG. 11 illustrates frame 18 for interconnecting the cylinder (reference numeral 12) with motive means (reference numeral 16), as shown in FIG. 3. In particular, it includes a box frame 190 for attachment to the upstream end of the cylinder. Plate 100 is located is located at the opposite end of frame 12 for supporting the motive means. A pair of longerons 192 and 194 interconnect box frame 190 and plate 100. To minimize flexing of frame 18 and to ensure positional stability between box frame 190 and plate 100, a pair of diagonal braces interconnect the upper end of box frame 190 with the lower end of plate 100. Moreover, C-channels 200, 202 are secured to plate 100 and to each of longerons 192, 194 and diagonal braces 196, 198. Thereby, flexing of plate 100 is essentially precluded. Furthermore, a horizontal brace 204 extends intermediate the midpoint of box frame 190 and plate 100 to further stabilize the box frame with the plate. It may be noted that the exact configuration of frame 18 may be varied from that described above, depending upon various factors. For example, frame 18 may be configured similarly to the functionally equivalent frame 206 shown in FIGS. 12 and 13. It may include vibration damping elements 207 of rubber or plastic composition disposed between frame 206 and lower framework 20. Suitable attachment devices well known to those skilled in the relevant vibration damping art provide the requisite physical interconnection.

At most locations, the footprint of a prover is of minor concern and the prover is usually mounted horizontally by means of framework 20 described above. For certain locations, such as the platform of an offshore oil rig, the surface area for equipment is at a premium. As the prover described above is of relatively significant size to perform its intended function, the footprint required for horizontal mounting is of some concern. To reduce the footprint required, a support structure may be added to framework 20 to permit vertical mounting of the prover. Because of the configuration of the prover, as described above, routine maintenance and repair can be performed whether the prover is mounted horizontally or vertically.

Figure 12:
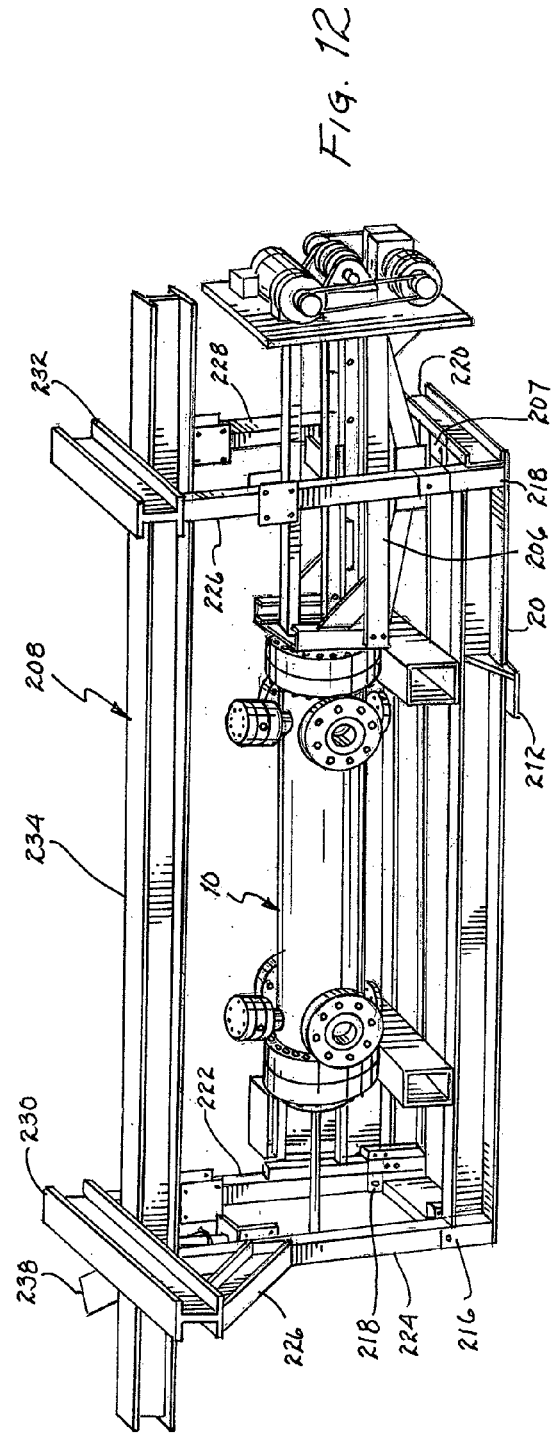
FIG. 12 is an isometric view illustrating the lower framework for supporting the prover horizontally and the upper framework for mounting the prover vertically.
Figure 13:
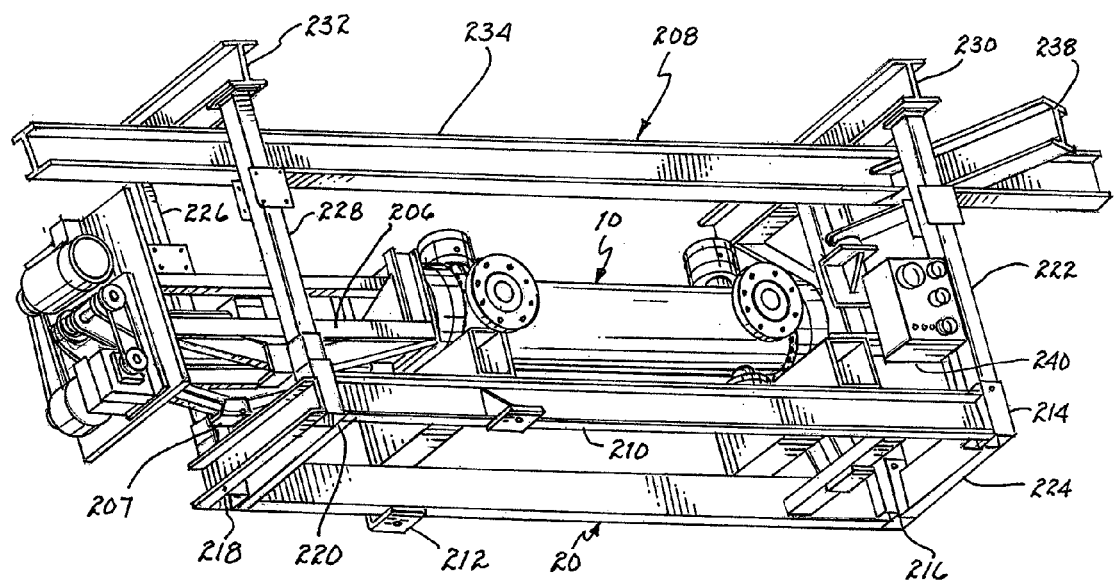
FIG. 13 is an isometric view illustrating the other side of the prover shown in FIG. 12.
Figure 14:
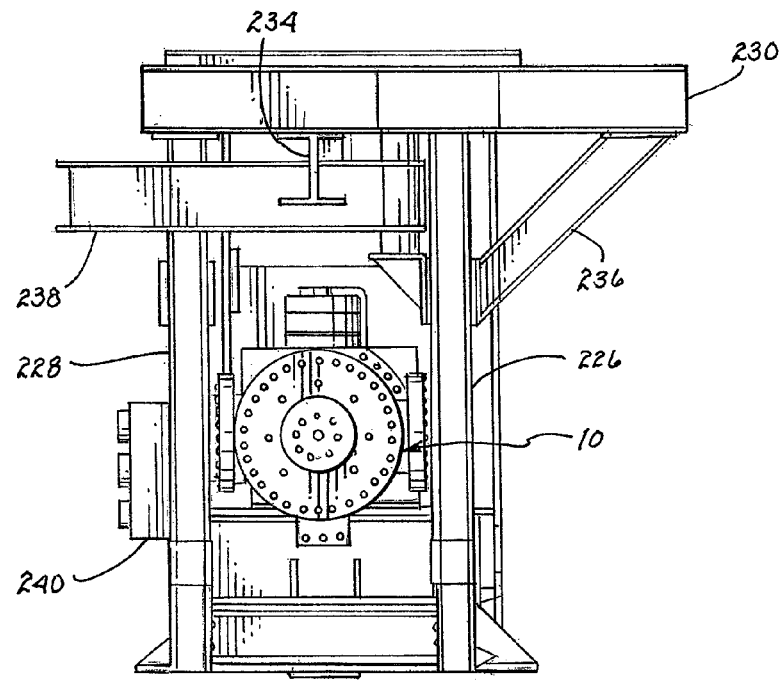
FIG. 14 is an end view of the prover illustrating the lower and upper frameworks for supporting the prover.

Referring jointly to FIGS. 12, 13 and 14, there is shown a prover 10 mounted upon framework 20. This framework may include a plurality of flanges (such as flanges 210, 212) for penetrably receiving bolts in threaded engagement with an underlying supporting surface. It may be defined as a lower framework. To provide an upper framework 208, each corner of framework 20 includes a length of square tubing 214, 216, 218 and 220 for receiving vertical stanchions 222, 224, 226 and 228, respectively. These stanchions are attached to the respective square tubings by bolts, welding or other robust attachment means. Stanchions 222, 224 support a horizontal I-beam 230. Stanchions 226, 228 support a similar I-beam 232. The attachment of these I-beams is the conventional manner well known to ironworkers. To provide further robustness to the upper framework, a further I-beam 234 is attached to the underside of I-beams 230, 232. Thereby, any sway or movement of the stanchions extending upwardly from framework 20 is unlikely to occur upon imposition of normal and expected loads. Additionally, I-beam 234 may be used as a support for hoisting components of prover 10 during maintenance and/or repair thereof Additional stability is provided by an angled I-beam 236 extending from one end of I-beam 230 to a location along stanchion 224. A yet further I-beam 238 extends from I-beam 234 for various purposes. As particularly shown in FIGS. 13 and 14, a cabinet 240 may be attached to stanchion 222 to support various gauges and control elements relating to operation of prover 10.

For normal operation of prover 10 at most land-based locations, a footprint of a horizontally oriented prover is acceptable. At such locations, the lower framework is attached to supporting structure to prevent movement of the prover relative to pipes and conduits connected thereto. For offshore oil rigs and other locations wherein the size of the footprint of the prover is of concern, upper framework 208 may be used. It is attached to appropriate and corresponding structures associated with the main platform of an offshore oil rig. Thereby, the prover is oriented vertically and the resulting footprint is significantly smaller than if the prover were mounted horizontally. Appropriate pipes and conduits would be employed to interconnect the prover with the flow meter being measured. Whether the prover is mounted horizontally or vertically, access to the prover for repair and maintenance purposes is essentially unimpeded by either the lower or upper framework. Thereby, there is little need to dismantle or otherwise disturb either the lower or the upper framework for these purposes and irrespective of the orientation of the prover at the location of use.

I claim:
1. Apparatus for mounting a prover having a longitudinal axis in a horizontal or a vertical orientation, the prover including a cylinder and piston assembly, a rectilinearly translatable shaft extending from the piston assembly, said apparatus comprising:
  a) a lower framework supporting the prover;
  b) motive means mounted on said lower framework, said motive means urging translation of the shaft of the prover;
  c) a frame rigidly attached to the prover for supporting said motive means; and
  d) an upper framework rigidly attached to said lower framework through a plurality of stanchions, whereby said lower framework and said upper framework envelope the prover about its longitudinal axis.

2. The apparatus as set forth in claim 1 wherein said frame includes diagonal braces and longerons whereby said motive means and the rod are accessible through said frame for maintenance and repair.

3. The apparatus as set forth in claim 1 wherein said frame extends from in between said upper framework and said lower framework.

4. The apparatus as set forth in claim 1 including vibration damping elements disposed intermediate said frame and said lower framework.

5. The apparatus as set forth in claim 1 wherein said frame includes first and second ends, said first end being attached to said prover, said motive means being disposed at said second end and driving elements interconnecting said motive means with the rod.

6. The apparatus as set forth in claim 5 wherein said motive means includes an electric motor.

7. The apparatus as set forth in claim 5 wherein said first end of said frame is enveloped by said upper framework and said lower framework.

8. The apparatus as set forth in claim 7 wherein said second end of said frame is external of the envelope defined by said upper framework and said lower framework.

9. The apparatus as set forth in claim 5 wherein said second end of said frame is external of the envelope defined by said upper framework and said lower framework.

10. Apparatus for mounting a prover having a longitudinal axis in a horizontal or a vertical orientation, the prover including a rectilinearly translatable shaft, said apparatus comprising:
   a) a lower framework supporting the prover;
   b) motive means mounted on said lower framework for translating the shaft of the prover; and
   c) an upper framework rigidly attached to said lower framework through a plurality of stanchions, and including I-beams attached to said upper framework for providing rigidity, whereby said lower framework and said upper framework envelope the prover about its longitudinal axis.

11. Apparatus for mounting a prover having a longitudinal axis in a horizontal or a vertical orientation, the prover including a rectilinearly translatable shaft, said apparatus comprising:
   a) a lower framework supporting the prover;
   b) motive means mounted on said lower framework for translating the shaft of the prover; and
   c) an upper framework rigidly attached to said lower framework through a plurality of stanchions, and including I-beams interconnecting said stanchions to prevent sway of said stanchions, whereby said lower framework and said upper framework envelope the prover about its longitudinal axis.

12. Apparatus for mounting a prover having a longitudinal axis in a horizontal or a vertical orientation, the prover including a rectilinearly translatable shaft, said apparatus comprising:
   a) a lower framework supporting the prover;
   b) motive means mounted on said lower framework for translating the shaft of the prover; and
   c) an upper framework rigidly attached to said lower framework through a plurality of stanchions, and including an I-beam interconnecting at least the upper end of a pair of said stanchions, whereby said lower framework and said upper framework envelope the prover about its longitudinal axis.

13. The apparatus as set forth in claim 12 including two pairs of stanchions and an I-beam interconnecting the upper end of each said pair of stanchions.

14. The apparatus as set forth in claim 13 including an angled I-beam interconnecting one stanchion of one of said pairs of stanchions with the respective one of said I-beams.

* * * * *